United States Patent
Kepecs (12) 
(10) Patent No.: US 6,330,543 B1
(45) Date of Patent: *Dec. 11, 2001

(54) METHOD AND SYSTEM FOR DISTRIBUTING AND RECONCILING ELECTRONIC PROMOTIONS

(75) Inventor: Jonathan Kepecs, Woodside, CA (US)

(73) Assignee: Concept Shopping, Inc., Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/191,591

(22) Filed: Nov. 13, 1998

Related U.S. Application Data (63) Continuation-in-part of application No. 08/970,526, filed on Nov. 14, 1997, now Pat. No. 6,009,411.

(51) Int. Cl.$^7$ ...................................................... G06F 17/60
(52) U.S. Cl. ................................................. 705/14; 705/26
(58) Field of Search ..................................... 705/14, 10, 27, 705/39, 26, 1; 235/378, 380, 382

(56) References Cited

U.S. PATENT DOCUMENTS

| | | | |
|---|---|---|---|
| Re. 34,915 | 4/1995 | Nichtberger et al. | 364/401 |
| 4,554,446 | 11/1985 | Murphy et al. | 235/487 |
| 4,723,212 | 2/1988 | Mindrum et al. | 364/401 |
| 4,817,043 | 3/1989 | Brown | 364/518 |
| 4,825,045 | 4/1989 | Humble | 235/383 |
| 4,882,675 | 11/1989 | Nichtberger et al. | 364/401 |
| 4,910,672 | 3/1990 | Off et al. | 364/405 |
| 4,941,090 | * 7/1990 | McCarthy | 705/14 |
| 4,949,256 | * 8/1990 | Humble | 705/14 |
| 4,982,346 | 1/1991 | Girouard et al. | 364/550 |
| 5,039,848 | 8/1991 | Stoken | 235/381 |
| 5,056,019 | 10/1991 | Schultz et al. | 364/405 |
| 5,117,355 | * 5/1992 | McCarthy | 705/14 |
| 5,173,851 | 12/1992 | Off et al. | 364/401 |
| 5,185,695 | * 2/1993 | Pruchnicki | 705/14 |
| 5,231,568 | 7/1993 | Cohen et al. | 364/401 |
| 5,305,195 | 4/1994 | Murphy | 364/401 |
| 5,373,440 | 12/1994 | Cohen et al. | 364/410 |

(List continued on next page.)

FOREIGN PATENT DOCUMENTS

| | | | |
|---|---|---|---|
| WO 85/01373 | * 3/1985 | (WO) | G06F/15/24 |
| WO 92/14213 | 8/1992 | (WO) | G06F/15/21 |
| WO 92/20030 | 11/1992 | (WO) | G06F/15/21 |
| WO 94/09440 | 4/1994 | (WO) | G06F/15/16 |
| WO 95/21428 | * 8/1995 | (WO) | G07G/1/14 |
| WO 97/23838 | 7/1997 | (WO) | G06F/17/60 |
| WO 97/30409 | 8/1997 | (WO) | G06F/17/60 |

OTHER PUBLICATIONS

Beck, Joseph, "3 Types of Systems Drive Coupon Programs", Supermarket News, vol. 37, p. 48, Jul. 13, 1987.*
Taylor, Scott. "Don't Become Confined by 'The Box'", Advertising Age, vol. 68, Issue 23, p. 26, Jun. 9, 1997.*

*Primary Examiner*—James P. Trammell
*Assistant Examiner*—John W. Hayes
(74) *Attorney, Agent, or Firm*—Gary T. Aka (57) ABSTRACT

A method and system for distributing and redeeming electronic promotions to a consumer through the Internet or other means is provided. An account which is associated with a unique key is maintained for each consumer account. Access is permitted to the consumer account upon presentation of the unique key over the Internet. The consumer is presented discount or other promotional choices of items available in at least one store associated with the key, or a collection of such stores, over the Internet and the selections of the discount or promotional choices made by the consumer over the Internet or other means are recorded. Upon purchase of items at the associated store by the consumer, such data are received, and the selections and purchases are reconciled to record a credit in the customer account. Unlike paper or electronic coupons, no consumer action other than the selection of promotions desired is required for item purchase.

67 Claims, 2 Drawing Sheets

U.S. PATENT DOCUMENTS

| | | | | |
|---|---|---|---|---|
| 5,380,991 | * | 1/1995 | Valencia et al. | 235/383 |
| 5,420,606 | | 5/1995 | Begum et al. | 345/156 |
| 5,459,306 | | 10/1995 | Stein et al. | 235/383 |
| 5,467,269 | * | 11/1995 | Flaten | 705/14 |
| 5,612,868 | | 3/1997 | Off et al. | 364/214 |
| 5,687,322 | | 11/1997 | Deaton et al. | 395/214 |
| 5,708,782 | | 1/1998 | Larson et al. | 395/214 |
| 5,710,886 | | 1/1998 | Christensen et al. | 395/214 |
| 5,761,648 | * | 6/1998 | Golden | 705/14 |
| 5,832,457 | | 11/1998 | O'Brien et al. | 705/14 |
| 5,855,007 | * | 12/1998 | Jovicic et al. | 705/14 |
| 5,857,175 | | 1/1999 | Day et al. | 705/14 |
| 5,907,830 | * | 5/1999 | Engel et al. | 705/14 |
| 5,909,023 | * | 6/1999 | One et al. | 235/380 |
| 5,923,016 | * | 7/1999 | Fredregill et al. | 235/380 |
| 5,924,080 | * | 7/1999 | Johnson | 705/14 |
| 5,956,694 | * | 9/1999 | Powell | 705/14 |
| 5,970,469 | * | 10/1999 | Scroggie et al. | 705/14 |
| 6,009,411 | * | 12/1999 | Kepecs | 705/14 |
| 6,014,634 | * | 6/2000 | Scroggie et al. | 705/14 |
| 6,014,638 | * | 1/2000 | Burge et al. | 705/27 |
| 6,026,370 | * | 2/2000 | Jermyn | 705/14 |
| 6,044,362 | * | 3/2000 | Neely | 705/27 |
| 6,076,068 | * | 6/2000 | DeLapa et al. | 705/14 |
| 6,237,145 | * | 5/2001 | Narasimhan et al. | 705/14 |

* cited by examiner

METHOD AND SYSTEM FOR DISTRIBUTING AND RECONCILING ELECTRONIC PROMOTIONS

The present application is a continuation-in-part of U.S. appln. Ser. No. 08/970,526, filed Nov. 14, 1997 now U.S. Pat. No. 6,009,411.

BACKGROUND OF THE INVENTION

The present invention relates generally to discounting and promotion of goods and services to consumers, and, more particularly, to the electronic distribution of promotions, such as discounts, rebates and special prices for goods and services, and the subsequent resolution upon the redemption of the promotions by consumers.

Heretofore, consumer discounts on specific goods or services have been in the form of physical tokens or coupons by which a consumer can obtain a discount on the price of a good or a service by redeeming the coupon. Typically, paper coupons are physically distributed to consumers. For instance, coupons are often distributed with newspapers, or by blanket mailing to residents of a neighborhood or region. Coupons are sometimes distributed with items so that purchasers are encouraged to continue their purchases of the item, i.e., to encourage brand loyalty.

More recent forms of coupon distribution have attempted to better target the potential purchasers of particular items. For example, coupons are placed on the back of store purchase receipts, such as those at supermarkets, so that the coupons target those who actively shop. The coupons can be changed at the stores to quickly respond to changes in marketing campaigns. Another form of coupon distribution takes advantage of the computerization of sales networks. When a sale of a particular item is entered on a Universal Product Code (UPC) reader at a store, such as a supermarket, a coupon For the same item or family of items may be created for the purchaser to ensure brand loyalty. Alternatively, the coupon may be for a competing band to encourage "brand-switching." Because the UPC reader is typically part of a large computer network, the distribution of the coupons can be changed or terminated very quickly.

Nonetheless, the problems of paper coupons still remain. Besides the distribution of coupons, the expense of the administration for the redemption of the coupons is high. Fraud remains a problem in coupon redemption and the targeting of consumers for particular goods and services can still be improved. Even electronic coupon distribution requires complex actions on the part of the consumer, such as printing a coupon or token, and taking it to a store for redemption. In the ideal case, electronic discounts should only require that a consumer who can be uniquely identified by a retailer be optionally subjected to some form of advertising prior to a discounted purchase. The discount should be implemented completely automatically at the cash register.

Furthermore, from the producer's and retailer's standpoint, the targeting of consumers remains difficult and expensive. Ideally, a database of all consumers would allow the precise targeting of advertisements, discounts or special prices being a form of advertisement, to individual consumers. The effectiveness of customer targeting would be maximized so that promotion money is spent where it is effective and not spent when it is ineffective. To that end, producers and retailers have used emerging technologies to identify consumers and their purchasing interests. Surveys using modern polling techniques have helped create such consumer databases, and computers have been used to correlate buying patterns of customers through store loyalty cards, for example.

However, such consumer identification remains elusive and expensive. Moreover, and perhaps more importantly, such goals of consumer identification are repugnant to notions of individual privacy. With the increased linking of computers by electronic networks, such concerns are likely to increase. Besides the individual resistance to divulging personal information, legal restraints on the use and gathering of personal information are possible, if not likely.

The present invention provides for a system and method which addresses these privacy concerns in a flexible way, while providing for the possibility of effective consumer targeting and automated discounting. The most appropriate discounts or other promotions are directed toward the individual consumer, yet the anonymity of the consumer is preserved. The present invention eliminates the paper coupon or its electronic counterpart, and is highly resistant to fraud. No paper coupons are handled by the consumer, the merchant, the manufacturer of the goods, or provider of the service.

Once the consumer is identified (with varying degrees of privacy protection) in accordance with the present invention, conventional forms of advertising may be directed precisely toward the consumer. The present invention allows the consumer's buying patterns to enable the targeting of the consumer with special discounts or prices on the goods or services he or she might buy. This targeting of promotions will also generally take into consideration factors beyond the simple interest of the consumer, such as the product cost and the consumer's sensitivity to discounted prices, which enable the producer and retailer to eliminate wasteful promotional spending.

In addition to facilitating the targeting of consumers individually by their purchasing habits, the present invention also permits the consumer to view their total buying history. This is not a feature currently available at the level of retail sales. While credit card companies today track purchases at the store level, purchases at the level of individual items are not tracked. The ability of a consumer to track his or her total consumption history is a unique feature of the current invention.

The present invention also permits the aggregation of several kinds of discounts. For example, a retailer loyalty program may offer a discount on an item, and a manufacturer may offer a discount on the same or a different item. The present invention permits a unified display and reconciliation of both discounts; in the former case by adding two discounts on the same item, and in the latter case, by displaying both discounts to the same consumer account.

SUMMARY OF THE INVENTION

To reach these seemingly contradictory goals, the present invention provides for a method and system for advertising electronic promotions to a consumer through a variety of means including a communications network, such as the Internet, and tying this advertising to the actual implementation of a special price or promotion at the point of sale. An aspect of the present invention is to allow a variety of advertising options to be used by the discounter and to make the promotions provided by the discounter available to the consumer in a secure, anonymous fashion at the point of sale, while retaining control over the degree of advertising required before making a promotion available.

An account is maintained for each consumer and a unique identifying key (ID) is associated with each consumer account. This account may be established by a registration process, such as is used in so-called "loyalty card" programs many retailers currently have in place. Access is permitted to the consumer account upon presentation of the unique ID over the communications network, or passively by using other advertising means, such as electronic mail to an e-mail address associated with the unique ID. The consumer is presented discount or special price choices of items available in at least one store associated with the unique ID, or a collection of such stores, via the advertising vehicle. Any selections of the choices made by the consumer over a communications network used to deliver the advertising are recorded when possible and are required to enable the associated promotions.

In one aspect of the present invention, the consumer can simply view the special prices or discounts available to him by providing his unique ID, and the simple fact that the consumer may have viewed these prices or discounts is recorded. Alternatively, no advertising may be required, or the advertising is otherwise specifically targeted to the consumer by other means, such as e-mail or individualized fliers sent anonymously to an address supplied by the holder of the unique ID, or by calling a so-called 800 number which allows the automatic binding of the caller's phone number to his unique ID. It is also possible to inform the consumer of future special discounts or prices directly on the cash register tape at the point of sale. For each consumer, the system records whether or not the consumer was exposed to any advertising about the price or discount, and the degree of exposure (for example, the consumer may have been asked to view extensive advertising and even to answer questions to qualify for a promotion.)

Upon purchase of items at the associated store by the consumer who makes his unique ID available, the details of the customer's purchase are recorded for analysis as to what future pricing or promotions should be offered to the consumer. Furthermore, the selections and purchases are reconciled to record a credit in the consumer's account, or the consumer simply pays the special prices uniquely advertised to him because the point-of-sale equipment has been informed of these prices when or prior to when the consumer's unique ID is input.

In one embodiment of the present invention, no direct consumer identification is maintained in the consumer account to preserve the anonymity of the consumer. For example, only the loyalty card identifier need be managed according to the present invention; the identity of the consumer is not needed. The purchasing history of each consumer at the stores where the promotions are redeemed for items (which need not be limited to the item(s) being promoted) is maintained in a database, and the consumer may access this history (in one embodiment of the invention.) This per-consumer history is called the microhistory. The microhistory can then be used not only to help the consumer in personal finance management efforts, but also to help the consumer identify trends in his buying habits, which may benefit from modification or reinforcement.

Thus, according to one embodiment of the present invention, a system can operate in the following manner: The consumer presents a unique identifier at the store's point of sale (POS). The consumer's purchases are recorded for subsequent analysis, and associated with the unique identifier in a secure fashion. Based on a variety of inputs, including, but not limited to, a consumer's response to advertising, microhistory, retailer cost data, retailer and manufacturer profitability requirements and input from manufacturers as to what promotions may be available, promotions that are unique to the consumer are calculated. Potentially beneficial promotions may also be presented to the manufacturer and retailer with the hopes of including these promotions in a subsequent promotion calculation. The calculated promotions are advertised (optionally) to the consumer, and prices that are not individualized (shelf prices) may also be calculated and sent to a shelf-pricing mechanism. The value of the promotions is realized at the point of sale, for example by directly charging the consumer his unique prices on items.

DETAILED DESCRIPTION OF THE SPECIFIC EMBODIMENTS

The channels of distribution of, and payment for, goods in a modern society are complex. Broadly stated, there is the producer that manufactures the goods, the retailer that sells the goods, and the consumer who purchases the goods. There is often a financial institution which supplies credit, for example, through a credit card, or which administers some other non-cash payment system, for example, through a debit card or a so-called smart card, for the consumer to purchase the goods. To compete in the marketplace, the producer and the retailer of goods employ advertising, including discounts, e.g., coupons, to encourage consumers to purchase their goods.

Increasingly, retail stores, especially chains of retail stores, are offering loyalty cards which reward shoppers for frequenting the store(s) covered by the loyalty card. Stores generally request additional customer information (such as name and mailing address) and assign the customer a unique (to the store or chain) number for identification purposes. When the loyalty card is used, advertised promotions are given to the consumer in the form of discounts or points, which may be redeemed directly at the point of sale as a credit against a purchase.

In such complex circumstances, the present invention takes advantage of another development in modern society, that of the Internet, and in particular, the Worldwide Web. With the development of the personal computer, the emergence of the so-called network computer, and computer/TV devices designed specifically to operate over the Internet, such as WebTV or NetPC units, more and more people are using the Internet to receive and transmit information. The present invention may use the Internet by which the consumer receives advertising and discount information, and possibly selects the desired promoted products. In certain cases, the consumer also receives information on the credits obtained by his or her purchase of discounted items. Conversely, the producer and retailer obtain useful consumer information to precisely and cost-effectively target their advertising and promotional offers.

This is all achieved without requiring the particular identities of consumers to be revealed. Privacy is thus preserved to a large extent and the amount of personal information released by the consumer is under his control. For example, if the consumer wishes to remain totally anonymous and uses only the Internet to receive advertising, his unique ID is sufficient. If the consumer wishes to access a so-called 800-number and provide only his unique ID, totally anonymous advertising can also be targeted at this consumer. If the consumer wishes to share just his phone number when he obtains his unique ID, the 800-number can even automatically associate the number the consumer calls from to his unique ID. Totally anonymous advertising can also be targeted at the consumer by printing out present or future advertising on the cash register tape issued upon that consumer's purchase of an item or service. If the consumer wishes to provide an e-mail address, telephone number or mailing address, other forms of advertising are possible, although with less anonymity for the consumer.

In general terms and in accordance with the present invention, consumers communicate with or are communicated to via an Advertising Server of a Discount Administrator Process (DAP) over the Internet or other advertising link. Each consumer identifies him or herself to or is identified by the Discount Administrator Process Advertising Server (DAPAS) by a unique KEY, which provides an identification of the consumer to the DAPAS, and at the same time, a barrier for the consumer from the DAP. The DAPAS makes the consumer aware (if required) of discounted and promotional items, which have been made available by discounting entities (the discounters), which offer the discounts, possibly as individual special prices, to the consumer. A discounter may be one or more direct producers, such as cereal makers; repackagers, such as stores offering products manufactured by producers under the stores' names; or stores which offer many discounted products which the stores resell. The discounts are indicated by amount or net price, locations where the discounted items may be purchased, any special restrictions (such as a limit on the number of items that may be purchased at the special price or requirements to purchase other items to qualify for the discount price) and time of expiration of the discounts. If an appropriate advertising form is used, the consumer makes his or her selections electronically, and the selections are recorded by the DAPAS if required, or the simple fact that the consumer was exposed to advertising may be recorded.

To obtain the discounts, the consumer visits an associated location, e.g., a store, and purchases the discounted items. To identify himself or herself to the store, the consumer uses the unique Key. The store sends a record of the purchases with the consumer's identifying Key to the DAP, i.e., the Discount Administrator Process. The DAP reconciles the consumer's selections with the purchases at the store and maintains the microhistory of the consumer's purchases (this history may be kept independently by the store, in which case, it may be desirable for the DAP to access the store's customer history database, sometimes called a Tlog, instead of maintaining a separate database.) The consumer may receive the discount (or his individualized prices) at the time of purchase, or receive a credit in a designated financial account, e.g., the consumer's credit card account. The DAPAS may inform the DAP when the consumer has been properly exposed to promotional advertising which in turn enables the promotion. Alternatively, the DAP may wish to offer the promotion concurrently with the advertising, or even with no advertising.

It should be noted that there is an exchange of benefits between the consumer and the discounter. In return for information containing the consumer's purchasing interests, the discounter gives the consumer a discount or some other promotional benefit. Hence it is often important that the consumer make a pre-selection of discounted items. However, it may be desirable to provide individualized pricing automatically to a consumer without any advertising—for example, to keep a favorite item at a certain price indefinitely so that there are no pricing surprises, or alternatively, to pleasantly surprise the consumer with an unexpectedly low price on an item.

Once the consumer has a KEY for identification, the present invention can also allow the consumer purchases to be, in effect, the selection of the discounts. That is, the tracking of the consumer's purchases allows the accumulation of information on the consumer's purchasing interests for which the discounts are given. The buying pattern of the consumer can affect the discounts available to the consumer with varying degrees of consumer participation.

Additionally, while this specification mentions the advertising, distribution, discounting and sale of goods, it should be understood that the present invention is equally applicable to discounted services as well.

The Electronic System Organization

The present invention operates over an organization of computers linked over networks. It should be understood that while a single computer might be described, the computer might be one or more computers which are tightly coupled (e.g., connected over a backplane), one or more programs on the same computer communicating via standard interprocess communication techniques, or more loosely coupled (e.g., connected by a network). Further, it should be understood that various functions of each computer might be distributed in other computers to reduce hardware requirements. For example, some or all software that provides the DAP 11 functionality might be run partially on the master store computer 23 and partially on store computer 22.

Figure 1:
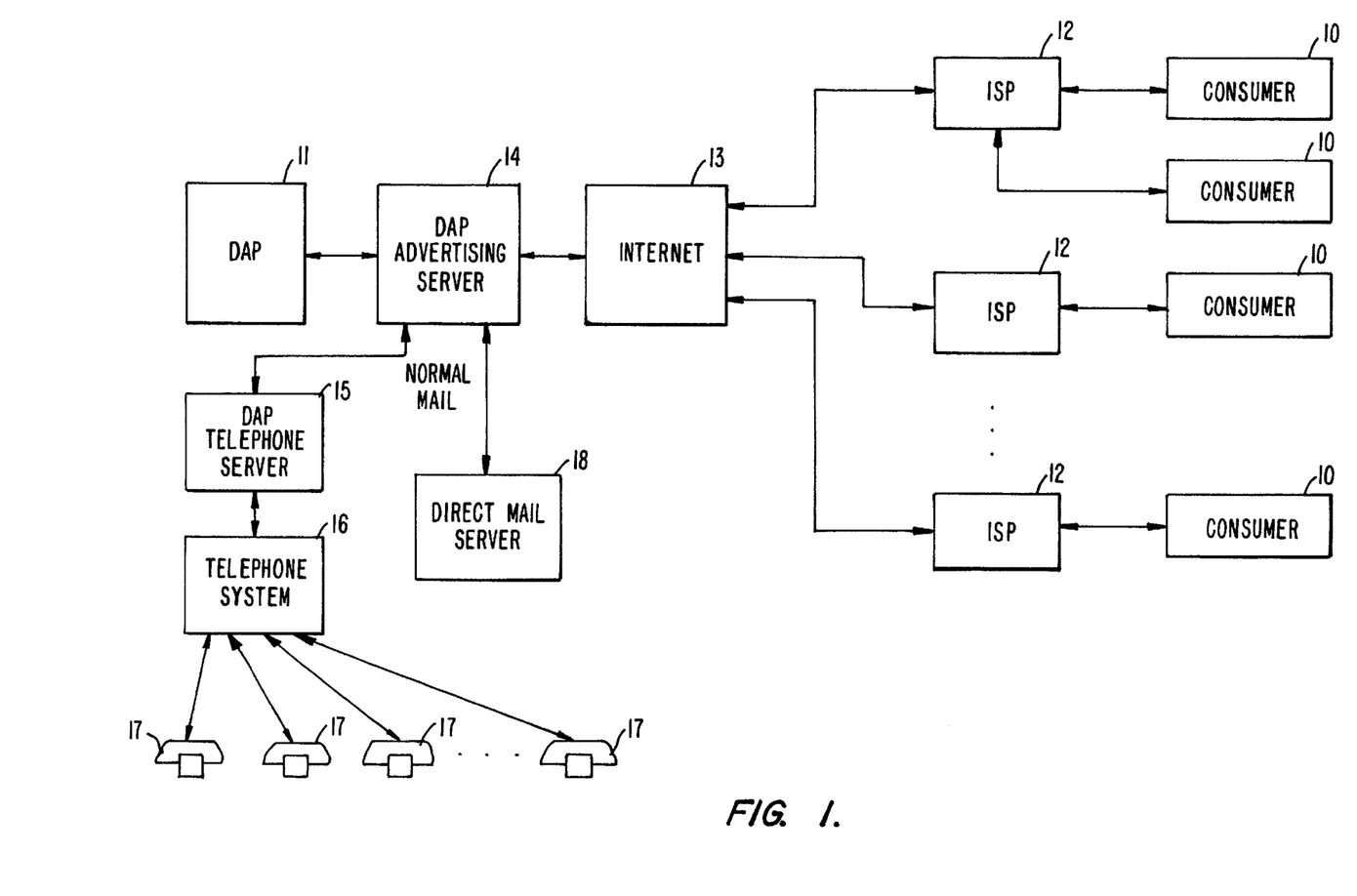
FIG. 1 is a block diagram of an advertising link between consumers and the Discount Administration Process (DAP), according to the present invention.

FIG. 1 illustrates the advertising link according to the present invention, the general interconnection of consumers to the Discount Administration Process Advertising Server (DAPAS) 14 by which the consumers receive advertising and discount information and make their selection of the "electronic discounts". The consumers can use their computers 10 for connection to the DAPAS 14 through the Internet or other advertising links as described below. The consumer computers 10 may be standard personal computers, the emerging so-called network computers, computer/TV devices designed specifically to operate over the Internet, such as WebTV or NetPC devices, or other data entry systems which permit two-way communication over the Internet (generally via email or a web browser.) The consumer computers 10 access the Internet through a computer server 12 of an Internet service provider (ISP). The ISP server 12 is connected to the Internet, a network of computers, represented by an Internet computer 13. The DAP computer 11 is responsible for computing the individual promotions offered to consumers via the DAPAS 14 and carrying out the effect of the promotions at the point of sale via the master store computer 23.

The DAP 11 employs a variety of inputs, strategies and constraints to arrive at targeted individualized discounts. These include, but are not limited to, the customer's purchase microhistory, retailer's cost basis and profit requirements, available manufacturer promotions, prospective manufacturer promotions, demographic information, how a consumer was advertised to, whether or not he responded to an advertisement, well-known marketing strategies such as giving greater discounts where consumers exhibit more price awareness, statistical analysis of how consumers have behaved in the past and might be expected to behave in the future, possible interactions with other loyalty or promotion or credit-card incentive programs the consumer may participate in, and feedback on how well a given set of promotions worked to achieve specific goals.

In one aspect of the present invention, which was described previously, the consumers can communicate with the DAPAS 14 by ordinary telephone 17 through the telephone system 16. The DAPAS 14 uses a DAP telephone server 15 as an interface to the telephone system 16. The DAPAS 14 may also interface with a direct-mail process 18 that informs consumers of available promotions by ordinary mail if the consumer provided an address to associate with their unique ID.

Figure 2:
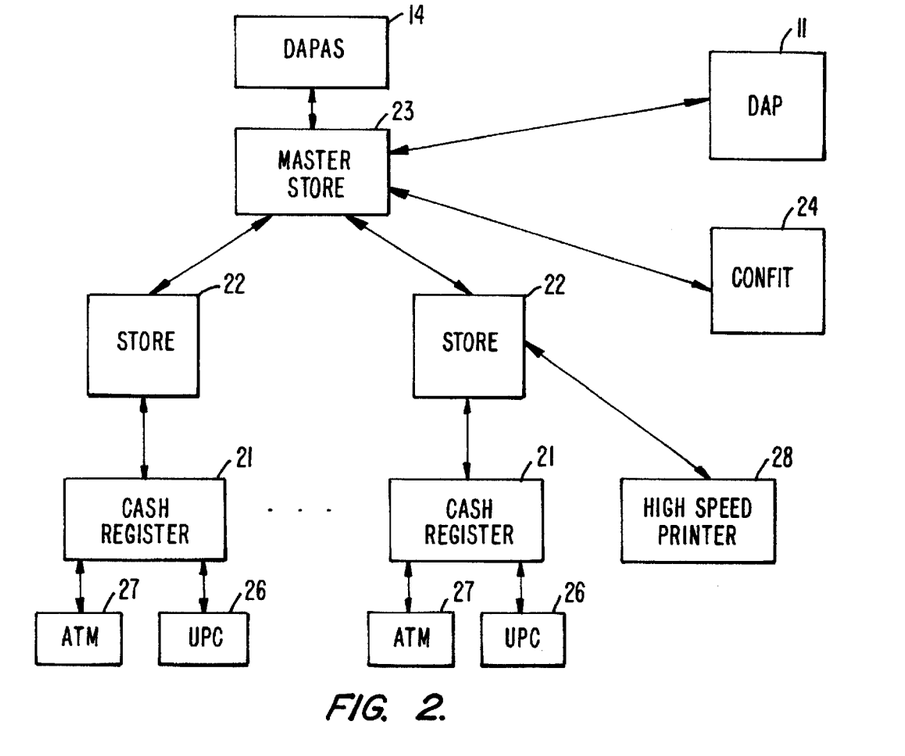
FIG. 2 is a block diagram of a representative point-of-sale computer network system, as found in a typical modern retail operation, and its connection to the DAP.

The DAPAS 14 may also inform consumers of available promotions via the master store computer 23 by simply printing all available promotions associated with a given loyalty card via a high-speed printer 28 generally located in the front of the store, or by displaying current or future promotions on a consumer's cash register receipt produced by cash register 21 The DAPAS 14 may also potentially communicate shelf prices to the master store computer 21.

The DAP computer 11 may also communicate with systems at manufacturers or other discounters 31 to obtain additional information on available promotions and to offer the manufacturer the opportunity to take advantage of promotional opportunities developed by the DAP. The DAP 11 may further act to automatically infuse and monitor promotion dollars provided electronically via the discounter's financial system 32 into the retailer's pricing or discount system controlled by master store computer 23. For example, the discounter may wish to spend not more than x dollars on a specific promotion, but may be willing to spend x+y dollars if the promotion is performing well as determined by computations made by DAP 11 or by a human monitoring the results of the promotions. In this manner, the DAP 11 can act as a financial controller for many aspects of a promotion. This interconnection is described further in the discussion on FIG. 3.

Besides connection to the DAPAS 14, the DAP computer 11 is also connected to the computers of the seller of the discounted goods. FIG. 2 is illustrative of the general organization of the point-of-sale operation, i.e., a large store chain, for goods (and services). The store, e.g., a supermarket, typically operates with electronic cash registers 21, essentially computers which record each item sold, calculate the sales totals, prints the receipt, and so forth. Each cash register 21 is often connected to a Universal Product Code (UPC) scanner 26 and/or an Automated Teller Machine (ATM) reader 27. The UPC scanner 26 identifies bar codes on the products to the cash register 21. The ATM reader 27 reads the magnetically encoded account number of a credit/debit/smart card that has been issued by some financial institution, such as a bank, or a store-issued loyalty card, belonging to a consumer. In the case of a smart card, a specific device may be employed to generate a credit on the smart card as a way of providing a discount. Some cards may also encode their identification number as a bar code which is read by the UPC scanner. The ATM reader 27 also typically accepts typed-in, or otherwise entered, private information, such as a personal information number (PIN), to securely identify the card holder. The store loyalty cards, which are typically used to uniquely and anonymously identify their customers, are generally read by the UPC scanner 26 or possibly a magnetic code reader such as the ATM reader 27.

In some larger stores, the cash registers 21 (and possibly high-speed printers 28) are connected to a store computer 22, which maintains the centralized inventory, pricing and discount information of the store. In turn, the store computer 22 is connected via a network to a master store computer 23. The master store computer feeds pricing information to many store computers 22 and acts as a clearinghouse for a variety of distribution, inventory and other information used in store operations. Of course, there can be multiple levels for store computers 22 depending upon the size of the retail operation. Naturally, nationwide store chains are likely to have many more computers and computer interconnections.

Outside of the retail network, the master store computer 23 is connected to the computers 24 of financial institutions (FIT). The FIT computers 24 verify and process the financial transactions involving credit, debit and smart cards, including those at the store register 21. Besides the connections to the FIT computers 24, the master store computer 23 is connected to the DAP computer 11. This connection permits the DAP computer 11 to reconcile the selections made by the consumer with the purchases at the store and maintain customer purchase microhistory (or access this history via a database (Tlog) maintained by the master store computer 23.) Further, the DAPAS 14 (under control of the DAP 11) can access the master store computer 23 for handling store advertising functions, such as setting shelf prices, accessing the high-speed printer 28 or the receipt printer of the cash register 21.

It should be noted that the computer network which interconnects the cash registers 21, UPC readers 22, ATMs 23, store and master store computers 22 and 23, and the FIT computers 24 belong a private network, i.e., not the Internet. Such networks are typically in the form of WANs (Wide Area Networks) of varying degrees of complexity. The DAP computer 11 is connected to this network to make the interconnections described above.

Figure 3:
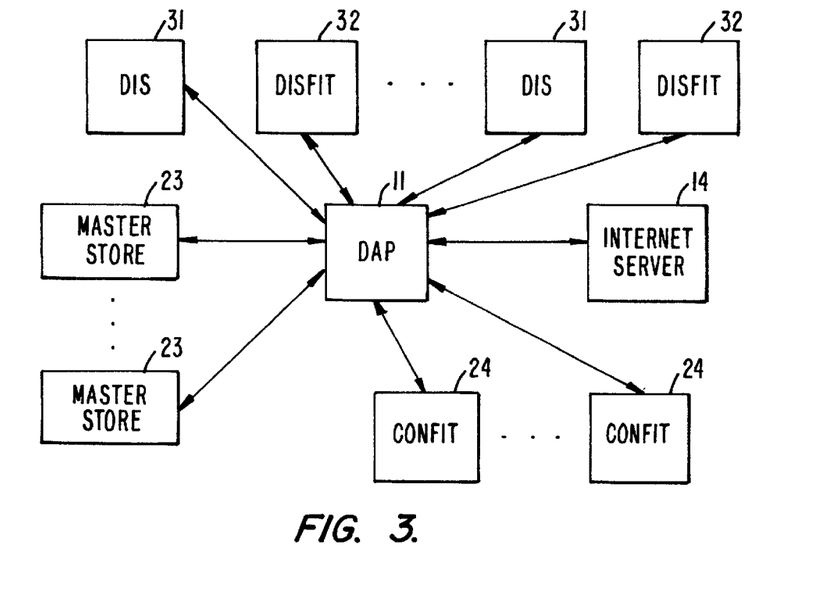
FIG. 3 is a block diagram of a computer network connection between the discounters and the DAP, according to the present invention.

FIG. 3 illustrates the general network interconnection of the DAP computer 11 with the computer 31 of a discounter (DIS), such as a manufacturer or a retailer, and a computer 32 of the discounter's financial institution (DISFIT). The connection to the DIS computer 31 allows the DAP computer 11 to receive discount information and propose new discount plans, detailed previously, from the discounter. The DAP computer 11 may communicate with the DISFIT computer 32 so that the discounter's account is debited for goods purchased by the consumers under the discounter's discount. The DAP computer 11 may also be connected to the computer 24 of the consumer's financial institution (CONFIT). This connection allows credit obtained by the purchase of discounted goods to be placed into the consumer's account at the consumer's financial institution in an embodiment of the present invention wherein the discount is not taken at a store register 21.

As in the case of the store WAN above, the computer network for the discounter and its financial institution(s) is another private network, typically a WAN. The DAP computer 11 is connected to this network and other private networks belonging to the financial institutions of the consumers.

Operations of the System
The Discount Administration Process Computer

The DAP computer 11 maintains a Key Database of the consumers' accounts. As explained above, a unique Key identifies the account of each consumer, but not necessarily the actual identity of the consumer. Each consumer may select his own Key, as long as the Key does not conflict with other Keys, or the Key may simply be assigned to a consumer.

Keys may be distributed by financial institutions, such as credit/debit/smart card companies, or by a third party, such as the operator of the DAP. A Key might also issued as a part of a retailer's loyalty card program. The stores accepting a particular Key are associated with the Key. For example, when the consumer specifies a unique identification (ID) bound to a particular loyalty program, retailer or chain, the stores associated with the Key are clearly defined. Of course, only certain identified stores within a chain may offer a particular promotion.

There can be different levels of identification in the Key Database. One level is the secure registration level. At this level, the Key Database, which is stored on the DAP computer 11, contains a consumer's KEY and one or more credit/debit/smart card account numbers (FIDs) issued by a financial or retail institution to the consumer. There is a database for each set of KEY's obtained by a separate registration process. Thus, if two different store chains with separate loyalty programs are in the database, the same consumer may be represented by two different KEY's, and the identity of the chain is implicit in which database is accessed. The Key Database appears as:

<$KEY_0$, $FID_0$, $FID_1$, ... $FID_K$>
<$KEY_1$, $FID_0$, $FID_1$, ... $FID_K$>
<$KEY_2$, $FID_0$, $FID_1$, ... $FID_K$>
<$KEY_2$, $FID_0$, $FID_1$, ... $FID_K$>
. . .
<$KEY_m$, $FID_0$, $FID_1$, ... $FID_K$>

The Key Database may contain alternatively or concurrently some other personal identification, such as a Social Security number, a driver license number, passport number, or even biometric information, such as a fingerprint, of the consumer.

A lower level of identification is protected registration. The Key Database contains the KEY and a lower level of identification of each consumer. An example is simply the KEY and the address of the consumer. It should be noted that it is sufficient in this method to simply identify the household belonging to a Key, for example, by mailing a Key-containing card to the occupant of a given address. In this way, while a consumer remains anonymous, the consumer will have significant difficulty in obtaining a second, unrelated account. Should an attempt be made by requesting another Key at the same address, the first Key can be invalidated. Should an attempt be made by requesting another Key at a different address, the existence of a Key already assigned to that different address can generate a request for the requester to either indicate a change of address (resulting in a different Key being subsequently issued to the previous address), or an invalidation of the original Key. This binding of Key to address thus allows the consumer to remain anonymous when accessing their account over the Internet, and allows the discounting computational system to maintain a consistent history of buying habits for a household, without compromising the individual's privacy. Note that the address might also be an e-mail address.

Finally, the lowest level of identification is simply the KEY with no other identification data. The consumer is completely anonymous. This method may be used by the DAP computer 11 even if the KEY has non-anonymous bindings elsewhere (for example, if the KEY is associated with a store's loyalty card). Thus, the consumer can still be anonymous to the DAP, even if the store is aware of the consumer's identity or just his address.

These different levels of identification imply different mechanisms and timing for reconciling the discounts of goods purchased by the consumer. These mechanisms are discussed below. An important aspect of the invention is that disjoint sets of KEYs may refer to the same consumer, yet still be reconciled to belong to one consumer. For example, a consumer may belong to two different loyalty cards, each with their own KEY. The DAP 11 may thus have:

<KEY1, store loyalty ID1>
<KEY2, store loyalty ID2>
. . .

One way to associate KEY1 and KEY2 to the same consumer is simply to allow the consumer to specify both Keys. This can allow the program running on the consumer's computer 10 to automatically correlate both accounts to present the consumer with a total summary of purchasing history, even though the DAPAS 14 is unaware of the correlation. It is also possible for the consumer to provide KEY1 and KEY2 (and KEY3, KEY4, etc.) to the DAPAS 14 so that the DAPAS 14 can make the association. This same technique can be used to correlate addresses if less secure Key binding is used.

Duplication of discounts is sometimes a problem. Within a single Key space (e.g., one bound to a single loyalty or credit card), duplication can be eliminated by simply refusing to issue more than one, or only a set number of, promotion(s) for a given item within a given time period. The same can be done across multiple correlated Key spaces. If Key spaces are un-correlated, then duplication cannot be categorically disallowed. However, because Key spaces are typically shared by non-conflicting retailers, and because the consumer can gain increasing benefits by repeatedly using the same Key space, duplication of promotions across un-correlated Key spaces is not a severe problem.

For the consumer's convenience, the DAP's agency may issue an identification card to each consumer with a magnetic or bar code for his Key. The card allows the consumer to quickly identify his Key and account at a store with a UPC scanner 26 or ATM reader 27. The card might also show the Key so that the consumer can type in his Key. Alternatively, for additional security, the consumer's identification card may carry an encrypted or hidden identification code (such as a PIN) before the consumer's Key is validated after being read at a store, for example. Alternatively, the DAP may simply rely on Keys already obtained by the store or credit card agency.

The Key Database is also accessed by the DAPAS 14. Whenever the consumer uses his or her computer 10 to access the DAPAS 14, he must specify his KEY. This enables the consumer to access information unique to himself, namely his microhistory and the individual promotions currently available to him. The DAPAS 14 presents the discounts available to the consumer over his computer 10. In addition to a menu search of available discounted products, a "stream of consciousness" search is also available. For a example, a consumer's interests may be queried. The DAPAS 14 then suggests that the consumer investigate products of a certain type.

Note that there is no particular security placed on a non-secure Key itself. The knowledge of such a Key does not compromise the security of the system, since the consumer's identity is unavailable for harassment (for example, by telemarketing firms) and selection of discounts by others using the Key confers no benefit on the person other than the true keyholder.

Selection of Discounts by the Consumer

Through his or her computer 10, the consumer may browse through the discounts or other promotions available to him or her at the DAP Advertising Server 14—this is generally the presentation of the Reconciled Discount list described below. A Web site provides access to a GUI on the consumer's computer 10 to easily access his or her account on the DAP computer 11. The Web site may be hosted on the DAPAS 14, or DAPAS 14 may interact with a remote Web host which in turn interacts with the consumer. If the consumer's Key is created through a particular company's loyalty card program, the consumer may be directed to a Web site operated by that company, which in turn interacts with DAPAS 14.

The consumer selects the desired discounts, e.g., the special prices on the displayed items. If required, the consumer also selects at which stores he will make the purchases. Additional information about the products, such as marketing information, may be displayed. For instance, from the consumer's microhistory the DAP computer 11 can make a correspondence with the consumer's Key and one or more stores where the consumer is likely to make his or her purchases and present promotions at those stores to the consumer. The selected discounts and their total value are displayed to the consumer and a per-account list of selected discounts, any restrictions on these discounts, when each discount was selected, and the expiration date of the discount, along with the discount value, is sent by the DAPAS 14 to the DAP computer 11.

To prevent tampering of the consumer's selections, the DAP computer 11 also has an optional security lock feature. Once the security lock is set, it is difficult, or impossible, for a malefactor to deprive a consumer of his selected discounts by subsequently deleting or changing them. This lock may be set by the consumer after his selections are made. The lock may also be set by the DAP if a pattern of misuse is detected, by the receipt of consumer complaints, for example.

As discussed previously, the Internet is only one of many ways by which a consumer may become aware of the discounts and special prices available to him. The Internet is perhaps the richest medium for this purpose and is employed here as the most general example of different advertising vehicles. Advertising vehicles may be classified according to their cost, the degree to which it may be verified that a consumer viewed an advertisement, the amount of consumer interaction required to deliver the advertisement, the time it takes to deliver an advertisement, and so on. It is not always necessary to advertise a promotion in order to deliver it. The present invention applies to all of the discussed forms of advertising.

Customer Purchase of Discounted Items at Store

To realize his discounts, the consumer identifies his Key during the purchase of items at a store. Each store maintains a record of the consumers' transactions, such as:

<KEY, <$UPC_0$, $PRICE_0$, $QUANTITY_0$>, <$UPC_1$, $PRICE_1$, $QUANTITY_1$>, . . . <$UPC_K$, $PRICE_K$, $QUANTITY_K$>, <$DISCOUNT_{13}$ $TYPE_0$, $VALUE_0$>, <$DISCOUNT\_TYPE_1$, $VALUE_1$>, . . . <$DISCOUNT\_TYPE_K$, $VALUE_K$>>

This transaction record is part of a customer transaction log or "Tlog". The example above is a simplification—for example, not all items in a store have a UPC but may be indexed by a different code.

The Tlog is stored in the store master computer 23, and may be accessed by the DAP 11, or the DAP may maintain its own version of the Tlog data. Each customer's microhistory is generally derived from the Tlog data, but may be computed directly from data received from the cash register 21 and UPC reader 26.

The consumer may provide his Key with a card containing the Key in the form of magnetically-encoded data or bar code data, which is simply scanned in. The Key may be in a separate card, or in a credit/debit/smart card which also includes the Key data. A retailer's loyalty card can include the Key data, which might simply be the store's loyalty card ID. The Key can also be provided by the consumer by simply entering the Key at an ATM reader 27 (using a template, such as those on push-button telephones) or letting the store clerk enter the Key at the register 21. More exotic forms include biometric identification.

Alternatively, the consumer need not specify his Key. With a list of financial institutions which are tied to the DAP consumer accounts, the store can automatically determine the consumer's Key. For example, upon the reading of his credit/debit/smart card, say, a VISA (a registered trademark of VISA International, Inc.) credit card, the store's register 21 automatically ties the transaction to the consumer's Key. Such accounts may be "read-only," or, more precisely, "deposit-only," financial institution accounts, which are credited with accepted promotions. The credits in these accounts are subsequently transferred into the consumer's liquid accounts upon validation of the identity of the cardholder.

Note that the Key may be securely associated with a customer's financial institution account (through the Key Database) without the DAP or the store knowing the financial institution account. Theft of a Key is not serious because someone in possession of the Key can only select discounts or other promotions which accrue to the actual Key holder. No significantly bad results can occur since the discounted products must still be legitimately purchased.

Regardless of how the KEY is presented by the consumer, the store's Tlog records all of the activity associated with each KEY. The set of discounts associated with each KEY is computed by the DAP 11, passed to master store computer 23, and thence to store computer 22, generally in advance of the customer's visit. The KEY is passed from register 21 to the store computer 22, along with the current consumer's transactions (purchases, paper coupons used, etc.) that form the part of the consumer's Tlog attributable to the current set of purchases. In return, the store computer 22, passes back the discounts or actual prices to charge the consumer, or, if the discounts are to be credited to a consumer's financial account, initiates the process of arranging this credit, described below in more detail. The store register 21 may also be directed to print information about the discounts, such as the list price and the customer's special price, total amount saved, potential future discounts available, and so on, on the customer's receipt.

Implementing Transactional Discounts

Some discounts may be limited as to the number allowed to a customer, whether or not they may be used in conjunction with other discounts including paper coupons, tied to a single use based on having spent a certain amount within a given time limit, and so on. Such discounts are termed Transactional Discounts. The store computer 22 must be provided with rules on how to fully reconcile each discount where possible, but some kinds of discount require that the store computer 22 interact with other computers to enforce the discounting rules.

When the calculation at the store computer 22 takes place to enforce transactional discounts, there is a flow of data from the store register 21 to the DAP computer 11 to describe the items actually purchased, and a reverse flow from the DAP computer 11 to the store register 21 (generally via the master store computer 23 and the store computer 22) which controls the discounts available to a given account. The latter flow is needed to ensure that discounts which have been used cannot be reused unless reuse of discounts is specifically allowed—the current validity of a transactional discount must be checked.

The flow of data to the store computer 22 from the DAP computer 11 typically occurs after the consumer selects applicable discounts from the DAPAS 14 and before the consumer arrives at the store. The DAP computer 11 may infer, based on likely location of the store where the discounts will be applied, or most likely applied, (either the store is expressly noted by the consumer, or the consumer's purchasing history may indicate likely store selection), the time interval the DAP computer 11 has before the master store computer 23 or store computer 22 must be informed to ensure that the consumer's discounts are available, etc. Similarly, there may be a time delay before the DAP computer 11 is informed of the actual purchases so that it may in turn be consulted by other stores to ensure that transactional discounts are properly controlled (since it may be reasonably assumed that some time is required for the consumer to go to a different store and attempt to re-use an accepted discount, and the store computer 22 and/or master computer 23 could track attempts by the consumer to re-use an accepted discount at the same store).

Alternatively, the DAP computer 11 or master computer 23 may be informed immediately upon consumer purchase, so that it may arbitrate the reuse policy on each discount to ensure that un-authorized duplicate discounts are not granted, even if the customer travels quickly from one store to another with the hope of obtaining the same discount several times. If the DAP computer 11 is always consulted for each consumer transaction, there is no requirement to pre-load store computers with promotion rules to implement at the register.

In any of the data flow scenarios where the DAP computer 11 and the store computer 22 or master store computer 23 do not interact immediately and information is saved for a period of time before the account is reconciled, we refer to this stored information as cached data. Caching data can reduce latency (so that the consumer need not wait for a remote transaction between the store and DAP computers take place), but introduces complexity since cached data can become invalid in many ways. For example, if several stores receive cached data about a given account, once the customer using the account makes a purchase, there is only a limited amount of acceptable delay before the cached data must be invalidated. This can be accomplished by having a computer act upon an invalidating event (the DAP computer 11 if, say, a discount is canceled or added; the store computer 22 when discounts are accepted) and informing its peer(s). Alternatively, the computer acting upon an invalidating event may first query its peer(s) to see if any other invalidating events have happened. If not, the transaction can be completed and the peer computer(s) put on notice that subsequent transactions should not be processed immediately. Otherwise, the transaction must wait until the invalidating event has been completely processed and any necessary cached data are reloaded.

Preparation of Discounts

As described earlier, the DAP 11 employs a variety of inputs to compute proposed pricing or discounts. These include, but are not limited to, the customer's purchase microhistory (or customer's Tlog data), retailer's cost basis and profit requirements, available manufacturer promotions, prospective manufacturer promotions, demographic information, how a consumer was advertised to, whether or not he responded to an advertisement, well-known marketing strategies, such as greater discounts where consumers exhibit more price awareness, statistical analysis of how consumers have behaved in the past and might be expected to behave in the future, possible interactions with other loyalty or promotion or credit-card incentive programs the consumer may participate in, and feedback on how well a given set of promotions worked to achieve specific goals.

To describe how the DAP 11 should compute the discounts, a formula language which computes actions based on predicates involving assertions about the state of a customer's Tlog and other states such as product information, may be used. Formulas control all of the system feedback as well, as consumer purchasing behavior based on promotional activity is measured and modifies the action of subsequent promotional activities of the system automatically. Without a flexible programming language interface, formulas must be hardwired into the system, making it difficult or impossible to insert new formulas into the system. The language that defines the formulas allows new formulas to be easily defined, and permits formulas that control the behavior of other formulas to be easily defined and modified, even while the system is running. Further, this language may be compiled from commands derived by employing a graphical user interface (GUI) that simplifies how formulas are described. Note that new formulas can easily be created and old or unsuccessful formulas can be removed, either manually or automatically. This GUI may also allow formula designers to test out the possible implications of a discounting action by simulating or predicting its result. Some of these potential results may be based on speculation as to how a discounter could achieve specific sales or marketing goals by infusing money into the system. These results are communicated to the discounter (who may also use the system himself to investigate potential marketing campaigns), and the discounter may elect to initiate the proposed targeted discounting campaign. By presenting a high-level interface to the formula programming language, the GUI makes it much easier for designers to implement and test new formulas, and to communicate the results of formula actions to designers, retailers, and manufacturers. The GUI may also be used to define how the system generates reports on its activity—for example, on how the results of a given set of formulas affected retailer profitability in a particular time period.

A Discount List database is created for a list of discounts due to each customer. Reconciliation with the consumer discount selections at the DAPAS 14 is also made to obtain the correct discounts due. In making the reconciliation between purchases and consumer selections, some discounters may not care if the purchase was made before the consumer's selection, instead of selection first. The reconciled data appears as records in the Reconciled Discount List database:

<KEY, STORE, DISCOUNT0, ITEMID0, DISCOUNT1, ITEMID1, . . . >

From the Reconciled Discount List database, the total discount due for each Key is computed and a list of discounts payable by the discounter is determined. The Reconciled Discount List is eventually communicated to the store computer 22 as described previously, in order that the store register 21 may implement the discounts that must be given at the point of sale.

Reconciliation of Consumer Accounts

Full reconciliation of a consumer account for the purposes of issuing a credit to a financial institution may require a number of steps to ensure full audit control. In the case where the discount or net price is taken at the register, the discounts are pre-authorized and the only major audit control needed is to ensure that the discounter has input the required amount of funds into the system, since the customer receives his discount at the register 21.

To reconcile each consumer account, the Reconciled Discount List database is validated as required against the purchase proofs (time, products, KEY, store ID) recorded at the store in the Tlog or in a microhistory maintained by the DAP 11, the Key database, a financial institution or read-only financial institution account number, the identity and quantity of the discounted items purchased, other applied discounts, and the time of purchase, for each consumer account.

From the discount information supplied by each discounter and stored on the DAP computer 11, and Reconciled Discount List database, a final list of discounts created by resolving conflicting discounts. For example, if a paper or electronic coupon had also been presented by the consumer for a discount, this discount may be disallowed. In the case of discounts taken at the register, resolution is generally carried out by the store computer 22 (subject to any transactional discount requirements as discussed previously) so the computer 22 must be generally be supplied in advance with rules for handling this reconciliation by the DAP 11 via the master store computer 23. In this case, the Reconciled Discount List database must be converted into rules that can be executed at the store computer 22.

When the discount is taken in the form of a credit to a consumer's financial instrument, the DAP computer 11 debits the discounter's financial account computer 32 and credits the consumer's financial institution account. Otherwise, the discount amount is simply deducted from the consumer's bill at the point of sale, or, if the consumer is provided with special pricing on a set of items, this special pricing is realized at the point of sale. It should be noted that a special price is distinct from a discount since the actual price of the item is guaranteed. If mapping information is not kept by the DAP 11 and the consumer's financial institution has the necessary information to make the mapping between the Key and a financial institution account, the necessary information is sent directly to the financial institution computer 24. All of these transactions are performed electronically where possible.

A full history of all data is retained for auditing purposes. Final auditing steps, such as the validation of store inventory to cover the store claims for credit of the sale of discounted items and certification by an external accounting agency, complete these steps of the operations.

The Reconciled Discount List database is also accessed by the DAP Advertising Server 14 so that each consumer, using his or her KEY, can browse his discount file, with as much security as the consumer desires (only the unique, anonymous ID is absolutely needed). This information also facilitates the consumer's selections since the database provides an indication of the consumer's interests by the previous purchases. For additional convenience and usefulness to the consumer, the consumer's information is available in industry standard format. This allows the consumer to use third party software, such as personal finance management of which Quicken, (a registered trademark of Intuit, Inc. of Mountain View, Calif.) is merely an example, to maximize the use of the consumer's information, for his or her benefit.

The purchasing history can be used to infer consumer marketing information without the intrusion of additional personal information disclosure or the burden of consumer surveys. The aggregation of the purchasing histories of the consumers can be used to find trends or patterns in consumer purchases as broadly or narrowly as desired. Nonetheless, despite this use of consumer information, the privacy of the particular consumer is protected as described above.

General Applications for the DAP Advertising Server

While the present description of the DAP Advertising Server (DAPAS) 14 envisions access via a Web browser, the DAPAS 14 should be viewed as a generalized advertising processor which need not involve the Internet. The DAPAS 14 is responsible for making the consumer aware of the promotions available to him, and typically (but optionally, depending upon the specific promotion), providing feedback to the DAP computer 11 as to what promotions were or were likely observed or selected by the consumer. The DAP computer 11 may or may not require this information to make its calculations.

The DAPAS 14 may make optimizations. For example, a consumer who starts using the Internet need not be sent expensive direct mail, and this information about the consumer can also be supplied to the DAP computer 11 to assist in its cost consideration methods. As described previously, the consumer may be informed of promotions by the Internet, email, 800-number, printed information on the cash register receipt, direct mail, or other targeted forms of advertising. The DAPAS 14 directs the advertising, the degree the consumer is involved—from no involvement, to passive involvement where the consumer may have been exposed to the promotion, to active involvement, where the consumer is known to have been exposed to the promotion (for example, by clicking the mouse on a given promotion.) The DAP computer 11 uses this information to decide what promotion to give. In some cases, a special price may be given regardless of whether or not a consumer was exposed to advertising about it; in other cases, the price may not be available until the consumer has been targeted by advertising. In either case, the DAP computer 11 controls aspects about the particular promotion, such as the length of the promotion, how many times the same item can be bought at the special price by the same consumer, and so on.

Security Features

It should further be observed that the present invention has many security features and options:

a. If the consumer's Key is associated with a financial institution account, Key secrecy is unnecessary since security depends only on the security of the financial institution account.

b. Stores cannot cheat (other than to falsely increase processing charges) by issuing false proofs of purchase to a Key issued by a financial institution since the benefit goes only to the true holder of the financial institution account.

c. If, instead of the DAP, a financial institution issues the Key to the consumer, only the Key is required to be shared with the DAP. Neither the store nor the DAP needs access to the consumer's financial institution account associated with the Key.

d. If a financial institution creates a special deposit-only account, which access is shared with the DAP and/or the store, only the financial institution may transfer money from this account to a main consumer account upon a discount validation by the DAP.

e. By limiting or prohibiting modifications to discounts selected by the consumer, a computer "hacker" with knowledge of the consumer's Key cannot frustrate the consumer by tampering with consumer selections.

f. By limiting the number of selected products, the time period during which the selected discounts remain valid, or by using simple challenges, consumers cannot abuse the system by simply selecting all discounts, or even having discounts selected by an agent program automatically, to avoid the conscious selection of discounts. If such were possible, consumers could obtain the benefits of discounts without returning to the discounters the benefit of their advertising, which benefit is usually desireable.

While the foregoing is a complete description of the embodiments of the invention, it should be evident that various modifications, alternatives and equivalents may be made and used. Accordingly, the above description should not be taken as limiting the scope of the invention which is defined by the metes and bounds of the appended claims.

What is claimed is:

1. A method for distributing and redeeming electronic promotions to a plurality of consumers through at least one communications network, comprising:

maintaining an account for each consumer;

associating each consumer account with a unique key;

permitting access by said consumer to said consumer account upon presentation of said unique key over said at least one communications network, said access including said consumer's purchasing history of promotions through said consumer account;

presenting promotion choices of items available at at least one store associated with said unique key over a selected communications network, including said at least one communications network to said consumer;

receiving data of purchased items by said consumer at said associated store; and reconciling said selections and purchases to credit said consumer.

2. The method of claim 1 wherein said reconciling step comprises recording a credit in said consumer account.

3. The method of claim 2 wherein said consumer account comprises a financial institution account.

4. The method of claim 3 wherein said financial institution account comprises a "deposit-only" account.

5. The method of claim 2 wherein said consumer account comprises a store loyalty program account.

6. The method of claim 2 wherein said consumer account comprises a discount account established by a third party.

7. The method of claim 1 wherein said reconciling step comprises directly crediting consumer at said associated store.

8. The method of claim 7 wherein said consumer account comprises a store loyalty program account.

9. The method of claim 7 wherein said consumer account comprises a discount account established by a third party.

10. The method of claim 1 wherein said reconciling step comprises directly implementing an individualized price on certain selected and purchased items.

11. The method of claim 1 wherein said presenting promotion choices step comprises presenting specific discounts on specific items.

12. The method of claim 1 wherein said presenting promotion choices step comprises presenting a purchase incentive for one or more items available in said associated store, said purchase incentive unrelated to said one or more items.

13. The method of claim 1 wherein said presenting promotion choices step comprises presenting specific prices on specific items.

14. The method of claim 1 wherein said presenting promotion choices step comprises presenting said promotion choices by telephone.

15. The method of claim 1 wherein said presenting promotion choices step comprises presenting said promotion choices by printer at said store.

16. The method of claim 1 wherein said presenting promotion choices step comprises presenting said promotion choices by electronic mail.

17. The method of claim 1 wherein said presenting promotion choices step comprises presenting said promotion choices by direct mail.

18. The method of claim 1 wherein said presenting promotion choices step comprises presenting said promotion choices by a cash register printer at said store.

19. The method of claim 1 wherein said presenting promotion choices step comprises calculating shelf prices for all consumers at said store.

20. The method of claim 1 further comprising the step of recording selections of said promotion choices made by said consumer over said communications network.

21. The method of claim 20 further comprising the step of sending data of said recorded selections to one or more of said associated stores within a preselected time limit after said recording selection step so that said data is sent prior to purchase of items by said consumer at said associated store.

22. The method of claim 21 further comprising the step of indicating discounts credited to said consumer account at the time of purchase of items by said consumer at said associated store.

23. The method of claim 22 further comprising the step of invalidating said sent data of said recorded selections to one or more of said associated stores within a preselected time limit after said time of purchase of items by said consumer at said associated store.

24. The method of claim 21 further comprising the step of inferring a likely associated store where purchase will occur by said consumer.

25. The method of claim 24 wherein said inferring step comprises inferring said likely associated store from the data of previously purchased items by said consumer.

26. The method of claim 24 wherein said inferring step comprises inferring said likely associated store from said unique key.

27. The method of claim 21 wherein said one or more associated stores are preselected by said consumer.

28. The method of claim 1 further comprising the step of sending data of said recorded selections to said associated store upon purchase of items by said consumer at said associated store so that discounts credited to said consumer account are indicated at the time of purchase of items by said consumer at said associated store.

29. The method of claim 1 wherein said receiving data of purchased items step occurs upon purchase of items by said consumer at said associated store.

30. The method of claim 1 wherein said receiving data of purchased items step occurs within a preselected time limit after purchase of items by said consumer at said associated store.

31. The method of claim 1 further comprising the step of presenting data of previously purchased items by said consumer over said communications network to said consumer.

32. The method of claim 31 wherein said data presenting step further comprises formatting said data to industry standards.

33. The method of claim 1 wherein said consumer account maintaining step has a limited direct identification of said consumer with said account.

34. The method of claim 33 wherein said consumer account maintaining step excludes identification of said consumer by name.

35. The method of claim 34 said consumer account maintaining step comprises:
maintaining a database of only said key, at least one financial institution account number, and purchasing history for each consumer.

36. The method of claim 35 wherein said financial institution account number comprises a credit card number.

37. The method of claim 35 wherein said financial institution account number comprises a debit card number.

38. The method of claim 35 wherein said financial institution account number comprises a smart card number.

39. The method of claim 33 wherein said consumer account maintaining step includes a name of each customer.

40. The method of claim 37 wherein said reconciling step further comprises:
communicating said credit to a financial institution account through said financial institution account number so that said financial institution account may be credited.

41. The method of claim 40 wherein said financial institution account is maintained in a smart card.

42. The method of claim 1 wherein said access permitting step is over the Internet.

43. The method of claim 42 wherein said access permitting step further comprises accessing said consumer account through a Web site upon presentation of said unique key by the consumer.

44. The method of claim 43 wherein said Web site is associated with said store.

45. The method of claim 1 further comprising the step of offering promotions to said consumer derived from received data of consumer purchases.

46. The method of claim 45 wherein said promotion offering step comprises targeting large aggregates of consumers.

47. The method of claim 45 wherein said promotion offering step comprises targeting individual consumers.

48. The method of claim 47 wherein said targeting step comprises inferring said individual consumers from purchasing and promotion selection data of said consumers.

49. The method of claim 48 wherein promotions offered to a targeted individual consumer include promotions for products and services based upon purchasing and promotion selection data of said consumer, said promotions for products and services unrelated to items actually purchased by said consumer.

50. A system for distributing and redeeming electronic promotions to a plurality of consumers comprising:
a first communications network interconnected to a plurality of first computers interfacing with said plurality of consumers;
at least one second computer connected to said first communications network, said second computer maintaining an account for each consumer, said account including a database, each consumer account accessible upon presentation of a unique key over said first communications network, said accessed account showing promotion choices of items available at at least one store associated with said key; and
a second communications network distinct from said first communications network, said second communications network interconnecting said second computer and at least one computer at said associated store so that said second computer and said store computer can exchange recorded selection data of promotion choices and purchase data of items at said associated store over said second communications network to reconcile said selections and purchases to credit said consumer.

51. The system of claim 50 wherein said second computer records data of selections of said promotion choices made by said consumer over said first communications network.

52. The system of claim 51 wherein said second computer reconciles said selections and purchases to record a credit in said consumer account.

53. The system of claim 51 wherein said store computer reconciles said selections and purchases to directly reduce a total price of selected and purchased items.

54. The system of claim 50 wherein said second computer maintains only limited direct identification of each consumer in said account database.

55. The system of claim 54 wherein said consumer account database excludes identification of said consumer by name.

56. The system of claim 55 wherein a record of said consumer account database has only said key, at least one financial institution account number, and purchasing history for each consumer.

57. The system of claim 56 wherein said financial institution account number comprises a credit card number.

58. The system of claim 56 wherein said financial institution account number comprises a debit card number.

59. The system of claim 56 wherein said financial institution account number comprises a smart card number.

60. The system of claim 56 wherein said consumer account database includes a name for each customer.

61. The system of claim 51 further comprising a third network connecting said second computer and a computer at a financial institution, said second computer communicating a credit to said financial institution computer so that an account of a consumer at said financial institution is credited to reconcile selections and purchases made by said consumer.

62. The system of claim 50 wherein said first network comprises the Internet.

63. The system of claim 62 wherein said first network further comprises a Web site presenting a consumer account accessible only upon presentation of said unique key by said consumer.

64. The system of claim 63 wherein said Web site is associated with said store.

65. The system of claim 63 wherein said Web site operates on a server, said server interacting with said second computer to access said consumer account.

66. The system of claim 50 wherein said accessed account presents data of previously purchased items by said consumer.

67. The system of claim 66 wherein said data of previously purchased items are formatted to industry standards.

* * * * *